UNITED STATES PATENT OFFICE.

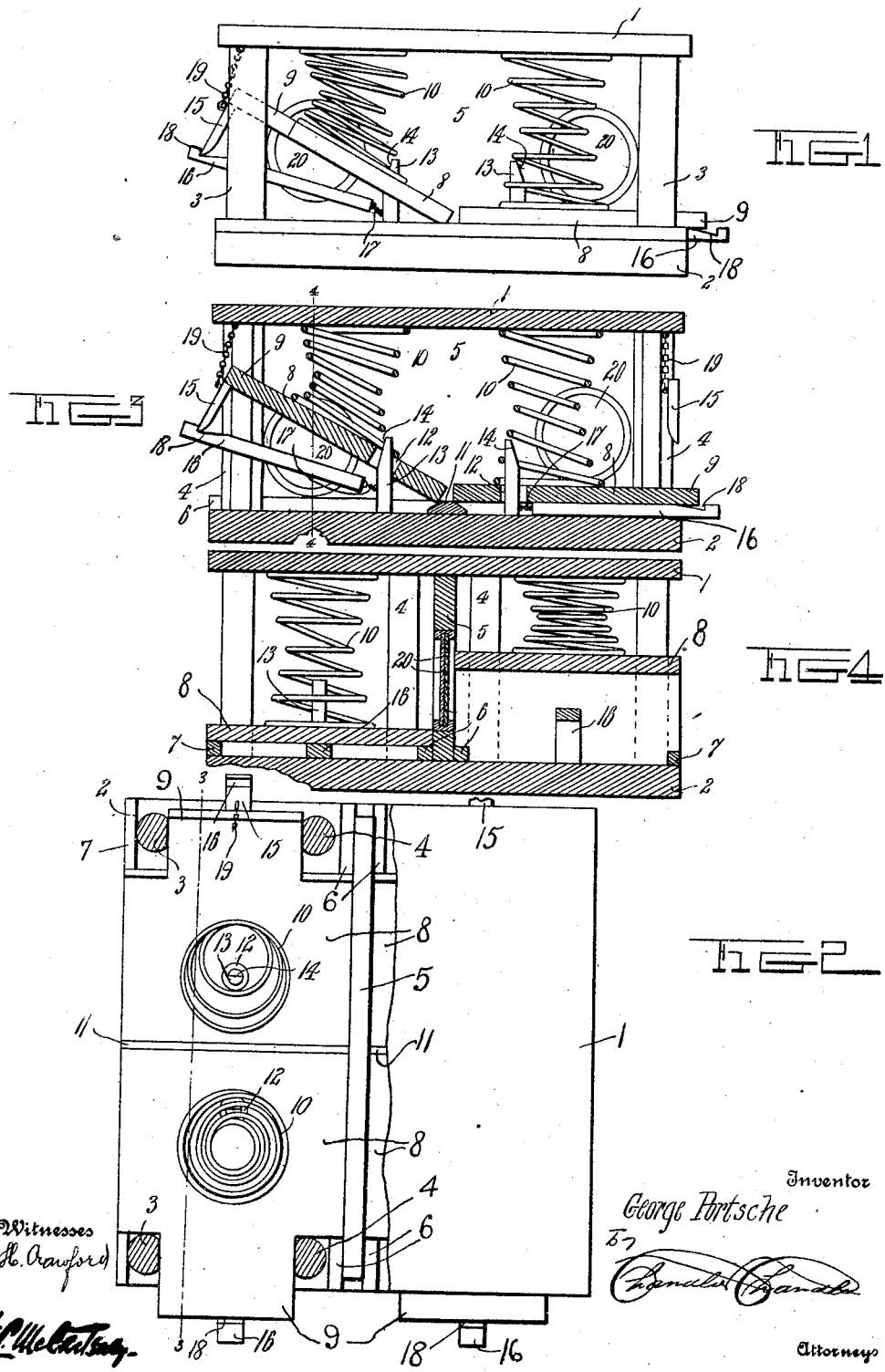

GEORGE PORTSCHE, OF LINCOLN, NEBRASKA.

ANIMAL-TRAP.

964,808.  Specification of Letters Patent.  Patented July 19, 1910.

Application filed October 8, 1908, Serial No. 456,746. Renewed March 24, 1910. Serial No. 551,314.

*To all whom it may concern:*

Be it known that I, GEORGE PORTSCHE, a citizen of the United States, residing at Lincoln, in the county of Lancaster, State of Nebraska, have invented certain new and useful Improvements in Animal-Traps; and I do hereby declare the following to be a full, clear, and exact description of the invention, such as will enable others skilled in the art to which it appertains to make and use the same.

The present invention relates to improvements in animal traps, and it has for its principal object the provision of an extremely simple, inexpensive and efficient device in which the animal is trapped by the downward movement of a spring pressed plunger arranged to be held in raised position against the tension of the spring by means of a trip mechanism, and to be sprung by the depression of one of the members thereof by the animal itself.

More especially, the invention resides in the particular manner in which the plunger is arranged and mounted and in the employment, as a trip mechanism, of a pair of mutually-coacting swinging catches, one of which is arranged to be engaged with the plunger and with the other catch, and to be released from such engagement when said other catch is depressed.

The invention further resides in the employment of a mirror which is located directly adjacent the trap mechanism, and serves to attract the animal toward the depressible catch so as to contact with and actuate the same.

The preferred embodiment of the invention is illustrated in the accompanying drawings, in which corresponding parts are designated by the same reference numerals throughout the several views.

Of the said drawings, Figure 1 is a front elevation of the improved trap, one of the plungers being shown as set, and the other as sprung. Fig. 2 is a plan view, a portion of the top plate of the trap being broken away. Fig. 3 is a vertical section on the line 3—3 of Fig. 2. Fig. 4 is a vertical section on the line 4—4 of Fig. 3.

The body of the trap, as shown in the drawings, comprises spaced top and bottom plates 1 and 2, corner posts 3, and a pair of center posts 4 located at each side of the body. Between these pairs of center posts extend the ends of a partition plate 5 which thus divides the body into front and rear sections. The lower longitudinal edge of the partition plate is disposed between a pair of rails 6 fastened to the bottom plate 2, the front and rear edges of which latter have secured thereto similar rails 7, the several rails each having a length equal to that of the bottom plate.

Within each section of the trap is disposed a pair of separate plungers 8 in the form of flat plates, each plate being formed at its outer side edge with a lateral tongue 9, which projects between the adjacent corner and center posts. These plungers are normally held against the upper faces of the rails 6 and 7 by means of heavy expansible coil-springs 10, whose upper ends are fastened to the under face of the top plate 1 while their lower ends bear upon the plungers. The combined length of each pair of plungers is slightly greater than that of the trap, their mutually-adjacent inner side edges being spaced from each other and disposed directly above a rib 11, which is likewise secured to the bottom plate 2, the longitudinal edges of each rib being oppositely beveled.

Each plunger is formed adjacent its inner side edge with an elongated opening 12 through which projects a vertical post 13 mounted upon the plate 2, the diameter of the posts being sufficiently less than the dimensions of the openings to permit the plungers to be swung upwardly into inclined positions upon their inner edges, as fulcra, as hereinafter described. That side of each post which faces the tongue 9 is beveled downward, as indicated by the numeral 14, thus affording an inclined surface along which the adjacent wall of the corresponding opening 12 will ride during the movements of the plunger.

Each plunger is held in raised position by means of a pair of swinging catches 15 and 16, which unite in forming a trip mechanism, as originally stated. Each catch 16 is connected at its inner end by a cord 17 with the adjacent post 13 and is formed adjacent its outer end with a notch 18, said catch having a length sufficient to dispose the notch beyond the corresponding side edge of the bottom plate. The outer wall of this notch is arranged to be engaged by the tapered lower end of the corresponding catch 15, which depends from the top plate 1, being connected therewith adjacent its upper end by a cord 19. The upper edge of each catch 15 is flat. As a result of this construction, each plunger may be swung upwardly into the position shown in Fig. 1, and retained in such position by engaging the flat upper edge of the corresponding catch 15 with the under face of its tongue 9, and the lower end of said tongue in the notch 18 formed in the corresponding catch 16, which latter is raised into position to permit such engagement.

The partition plate 5, above referred to, has set into both of its faces a pair of mirrors 20, located adjacent the ends thereof. These mirrors, as will be apparent, will reflect the image of the animal to be trapped and aided by the bait, which may be placed upon the catch 16, or between the latter and the mirror, upon the bottom plate, as preferred, will serve to attract the animal to a closer inspection. On entering the trap, the animal will approach the catch 16, and will either depress the latter, or move it sidewise, either movement tending to discharge the end of the catch 15 from the catch 18, whereupon the plunger will swing downwardly under the pressure of the spring 10, trapping the animal, and in most instances, injuring him.

Owing to the provision of the partition plate, and to the particular arrangement of the plungers and mirrors, it will be apparent that the trap, as a whole, comprises in effect, four separate traps, each of which may be set, baited, and sprung independently of the other three.

The trap may be made of various sizes, as will be understood, according to the particular animal it is designed to catch.

What is claimed is:

1. In an animal trap, the combination with a body including spaced top and bottom plates, of a plunger interposed therebetween and formed adjacent its inner end with an opening; a vertical post set into the bottom plate and arranged to extend through said opening; means for normally forcing the plunger toward said bottom plate; a catch suspended from the top plate and having a flexible connection therewith, said catch having its upper end arranged for engagement with the plunger when the latter is in its raised position; and a catch interposed between the plunger and the bottom plate, and having a flexible connection at its inner end with said post, the outer end of said catch being arranged for engagement with the lower end of the first-named catch.

2. In an animal trap, the combination, with a body including spaced top and bottom plates, of a plunger interposed therebetween and formed adjacent its inner end with an opening; a vertical post set into the bottom plate and arranged to extend through said opening; means for normally forcing the plunger toward said bottom plate, said means being arranged to one side of the projecting end of said post; a catch suspended from the top plate and having a flexible connection therewith, said catch having its upper end arranged for engagement with the plunger when the latter is in its raised position; and a catch interposed between the plunger and the bottom plate and having a flexible connection at its inner end with said post, the outer end of said catch being arranged for engagement with the lower end of the first-named catch.

3. In an animal trap, the combination with a body including spaced top and bottom plates, and a transversely-arranged rib secured to the latter plate, of a plunger interposed between said plates and having its rear end arranged to rest upon said rib, said plunger being formed adjacent said end with an opening; a vertical post set into the bottom plate and arranged to extend through said opening; means for normally forcing said plunger toward the bottom plate, said means being arranged to bear upon the plunger at one side of the projecting end of the post; a catch suspended from the top plate and having a flexible connection therewith, the upper end of said catch being arranged for engagement with the under face of the plunger when the latter is in its raised position; and a catch interposed between the plunger and the bottom plate and connected at its inner end with said post, said catch being formed at its outer end with a notch arranged to receive the lower end of the first-named catch.

4. In an animal trap, the combination with a body including spaced top and bottom plates and posts connecting the same, of a plurality of independently mounted plungers interposed between said plates and supported in pivotal relation to the bottom plates, independent means for each plunger located between the top plate and plungers for normally forcing the latter toward said bottom plate, a trip mechanism for each plunger arranged for engagement with said plunger, to hold the same in raised position, and mirrors for reflecting the image of an animal entering the trap beneath any of the plungers, and a common support for said mirrors.

In testimony whereof, I affix my signature, in presence of two witnesses.

GEORGE PORTSCHE.

Witnesses:
FREDERICK E. BERTRAND,
L. C. SEXTON.